(12) United States Patent
Gerard et al.

(10) Patent No.: US 9,818,101 B2
(45) Date of Patent: Nov. 14, 2017

(54) SYSTEM AND METHOD FOR SOCIALLY CONNECTING PAYMENT CARD HOLDERS

(71) Applicant: MASTERCARD INTERNATIONAL INCORPORATED, Purchase, NY (US)

(72) Inventors: Jean-Pierre Gerard, Croton-on-Hudson, NY (US); Kent Olof Niklas Berntsson, Rye, NY (US); Ali Kristen Taylor, Greenwich, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/018,589

(22) Filed: Sep. 5, 2013

(65) Prior Publication Data

US 2015/0066743 A1    Mar. 5, 2015

(51) Int. Cl.
    *G06Q 30/02*    (2012.01)
    *G06Q 20/22*    (2012.01)
    *G06Q 50/00*    (2012.01)
    *G06Q 20/02*    (2012.01)
    *G06Q 20/08*    (2012.01)

(52) U.S. Cl.
    CPC ........... *G06Q 20/227* (2013.01); *G06Q 20/02* (2013.01); *G06Q 20/0855* (2013.01); *G06Q 50/01* (2013.01)

(58) Field of Classification Search
    None
    See application file for complete search history.

(56) References Cited

U.S. PATENT DOCUMENTS

| 7,099,831 | B2 | 8/2006 | Modoka |
| 7,983,951 | B2 | 7/2011 | Frohwein et al. |
| 8,245,920 | B1 | 8/2012 | Katyal et al. |
| 8,250,096 | B2 | 8/2012 | Su et al. |
| 8,291,016 | B1 | 10/2012 | Whitney |
| 8,316,086 | B2 | 11/2012 | Ufford et al. |
| 8,407,148 | B2 | 3/2013 | Yoder et al. |

(Continued)

FOREIGN PATENT DOCUMENTS

| WO | 2014047120 | 3/2014 |
| WO | 2014047162 | 3/2014 |

*Primary Examiner* — Robert R Niquette
*Assistant Examiner* — Joseph W King
(74) *Attorney, Agent, or Firm* — Ohlandt, Greeley, Ruggiero & Perle, L.L.P.

(57) ABSTRACT

A method for socially connecting payment card holders is provided. The method involves providing one or more databases configured to store payment card holder information including at least purchasing and payment activities attributable to the payment card holders; providing one or more databases configured to store payment card holder profiles; generating the payment card holder profiles based on the payment card holder information; providing the payment card holder profiles to payment card holders that have been granted access to the one or more databases configured to store the payment card holder profiles; and effecting targeted interaction between the payment card holders based at least in part on the payment card holder profiles. A system for socially connecting payment card holders is also provided.

13 Claims, 5 Drawing Sheets

(56) References Cited

U.S. PATENT DOCUMENTS

| | | |
|---|---|---|
| 8,606,630 B2 | 12/2013 | Fordyce et al. |
| 8,738,418 B2 | 5/2014 | Winters |
| 8,744,906 B2 | 6/2014 | Fordyce et al. |
| 2003/0163427 A1 | 8/2003 | Fung et al. |
| 2005/0131757 A1 | 6/2005 | Chan et al. |
| 2005/0216300 A1 | 9/2005 | Appelman |
| 2007/0067297 A1 | 3/2007 | Kublickis |
| 2007/0168216 A1 | 7/2007 | Lemelson |
| 2008/0005073 A1 | 1/2008 | Meek |
| 2009/0070228 A1 | 3/2009 | Ronen |
| 2009/0171686 A1 | 7/2009 | Eberstadt |
| 2009/0172783 A1 | 7/2009 | Eberstadt |
| 2011/0055110 A1 | 3/2011 | Kolyvanov et al. |
| 2011/0087550 A1 | 4/2011 | Fordyce et al. |
| 2011/0093324 A1 | 4/2011 | Fordyce et al. |
| 2011/0106607 A1 | 5/2011 | Alfonso et al. |
| 2011/0125569 A1 | 5/2011 | Yoshimura |
| 2011/0166869 A1* | 7/2011 | Froelich .................. H04L 63/08 705/1.1 |
| 2011/0246272 A1 | 10/2011 | Joa |
| 2011/0302039 A1 | 12/2011 | Fordyce et al. |
| 2012/0016731 A1 | 1/2012 | Smith et al. |
| 2012/0041879 A1 | 2/2012 | Kim |
| 2012/0089446 A1 | 4/2012 | Gupta |
| 2012/0101881 A1 | 4/2012 | Taylor et al. |
| 2012/0143752 A1 | 6/2012 | Wong et al. |
| 2012/0143761 A1 | 6/2012 | Doran |
| 2012/0150598 A1 | 6/2012 | Griggs |
| 2012/0158589 A1 | 6/2012 | Katzin et al. |
| 2012/0190386 A1* | 7/2012 | Anderson .................. 455/456.3 |
| 2012/0203632 A1 | 8/2012 | Blum |
| 2012/0215604 A1 | 8/2012 | Canetto |
| 2012/0215610 A1 | 8/2012 | Amaro et al. |
| 2012/0215724 A1 | 8/2012 | Ross |
| 2012/0239479 A1 | 9/2012 | Amaro |
| 2012/0271691 A1 | 10/2012 | Hammad et al. |
| 2013/0031181 A1 | 1/2013 | Eberstadt |
| 2013/0085869 A1 | 4/2013 | Carlson |
| 2013/0211913 A1 | 8/2013 | Ross |
| 2013/0262209 A1 | 10/2013 | Boyer |
| 2013/0304576 A1 | 11/2013 | Berland |
| 2013/0346264 A1 | 12/2013 | Falkenborg et al. |
| 2014/0067462 A1 | 3/2014 | Korosec |
| 2014/0081750 A1 | 3/2014 | Hosp |
| 2014/0164083 A1 | 6/2014 | Wilkes |
| 2016/0219114 A1* | 7/2016 | Keyani .................. H04L 67/20 |

* cited by examiner

SYSTEM AND METHOD FOR SOCIALLY CONNECTING PAYMENT CARD HOLDERS

BACKGROUND OF THE DISCLOSURE

1. Field of the Disclosure

The present disclosure relates to a system and method for socially connecting payment card holders. More particularly, the present disclosure relates to a system and method for socially connecting through payment card holder profiles based upon payment card holder financial transaction information (e.g., purchasing and payment transactions).

2. Description of the Related Art

The popularity and growth of social network sites and services has increased dramatically over the last few years. Present social network sites include Facebook, Google+, Twitter, MySpace, YouTube, LinkedIn, Flicker, Jaiku, MYUBO, Bebo, and the like. Such social networking sites are typically web-based and organized around user profiles and/or collections of content accessible by members of the network. Membership in such social networks is composed of individuals, or groupings of individuals, who are generally represented by profile pages and permitted to interact as determined by the social networking service.

In many popular social networks, especially profile-focused social networks, activity centers on web pages or social spaces that enable members to view profiles, communicate and share activities, interests, opinions, status updates, audio/video content, and the like, across networks of contacts. Some social networking services also allow members to track certain activities of other members of the social network, collaborate, locate and connect with existing friends, former acquaintances and colleagues, and establish new connections with other members.

Individual members typically connect to social networking services through existing web-based platforms via a computing device, tablet or smartphone. Members often share a common bond, social status, or geographic or cultural connection with their respective contacts. Smartphone and games-based mobile social networking services are examples of rapidly developing areas.

While social networks are usually composed of individuals, members might also include companies, restaurants, political parties and event profiles that are represented in a like manner to human members (e.g., profile pages accessible by members of a social network).

The member profiles on social network sites are typically generated from information provided by individual members and overseen by the social networking service. Such information may or may not be accurate. When members view profiles, communicate and share activities, interests, opinions, and the like, across networks of contacts, there can be uncertainty about the veracity of profile information. In many instances, the members blindly trust the information in the profiles that appear on their screen.

As the use of social networks continues to proliferate, the limitations of sharing of informational content and the like, software functionality/services, and monitoring and security measures used in the context of social networks become more of a concern. As a result, it becomes apparent that current informational content, software functionality/services, and monitoring and security measures are less than perfect.

Accordingly, there is a need for a social network where member profiles are based at least in part on real information or data, such as financial transaction data, and not solely on subjective information provided by a member.

SUMMARY OF THE DISCLOSURE

There is provided a system and method for socially connecting payment card holders, particularly through payment card holder profiles based upon payment card holder financial transaction information (e.g., purchasing and payment transactions).

There is also provided a method for socially connecting payment card holders. The method involves providing one or more databases configured to store payment card holder information including at least purchasing and payment activities attributable to said payment card holders; providing one or more databases configured to store payment card holder profiles; generating the payment card holder profiles based on the payment card holder information; providing the payment card holder profiles to payment card holders that have been granted access to the one or more databases configured to store the payment card holder profiles; and effecting targeted interaction between the payment card holders based at least in part on the payment card holder profiles.

There is further provided a system for socially connecting payment card holders. The system involves one or more databases configured to store payment card holder information including at least purchasing and payment activities attributable to said payment card holders; one or more databases configured to store payment card holder profiles; a processor configured to generate the payment card holder profiles based on the payment card holder information; and means to provide the payment card holder profiles to payment card holders that have been granted access to the one or more databases configured to store the payment card holder profiles.

There is yet further a method for generating payment card holder profiles. The method involves retrieving, from one or more databases, information including activities and characteristics attributable to one or more payment card holders; analyzing the information to determine behavioral information of the one or more payment card holders; extracting information related to an intent of the one or more payment card holders from the behavioral information; and generating one or more payment card holder profiles based on the behavioral information and intent of the one or more payment card holders.

These and other systems, methods, objects, features, and advantages of the present disclosure will be apparent to those skilled in the art from the following detailed description of the embodiments and the drawings.

BRIEF DESCRIPTION OF THE DRAWINGS

A component or a feature that is common to more than one figure is indicated with the same reference number in each figure.

DESCRIPTION OF THE EMBODIMENTS

Embodiments of the present disclosure now are described more fully hereinafter with reference to the accompanying drawings, in which some, but not all, embodiments of the disclosure are shown. Indeed, the disclosure can be embodied in many different forms and should not be construed as limited to the embodiments set forth herein. Rather, these embodiments are provided so that this disclosure may satisfy applicable legal requirements. Like numbers refer to like elements throughout.

As used herein, entities can include one or more persons, organizations, businesses, institutions and/or other entities, such as financial institutions, services providers and the like that implement one or more portions of one or more of the embodiments described and/or contemplated herein. In particular, entities can include a person, business, school, club, fraternity or sorority, an organization having members in a particular trade or profession, sales representative for particular products, charity, not-for-profit organization, labor union, local government, government agency, or political party.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies, such as infrared, radio, and microwave, then the coaxial cable, fiber optic cable, twisted pair, DSL, or wireless technologies, such as infrared, radio, and microwave, are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should be included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It can be understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Thus, apparatus, systems, methods and computer program products are herein disclosed to generate payment card holder profiles, to identify, analyze, extract and correlate consumer activities and characteristics that are used to generate the payment card holder profiles, and also an opportunity for providing payment card holder profiles to payment card holders to effect targeted interaction between the payment card holders. Embodiments of the present disclosure will leverage the information available to identify data that is indicative of a customer's activities and characteristics and to generate payment card holder profiles from that data. Such activities and characteristics can include, but are not limited to, spending behavior, age, gender, residence, graduation from college, a new job, marriage, the birth of a child, the purchase of a house, the purchase of a car, a member of the household starting college, and the like. By identifying and analyzing consumer activities and characteristics, payment card holder profiles can be generated and payment card holder interaction can be effected based on the payment card holder profiles.

As used herein, "payment card holder" means a person or entity that possesses a payment card (e.g., credit card and/or debit card from a payment card company such as MasterCard®, VISA® or American Express®).

Figure 1:
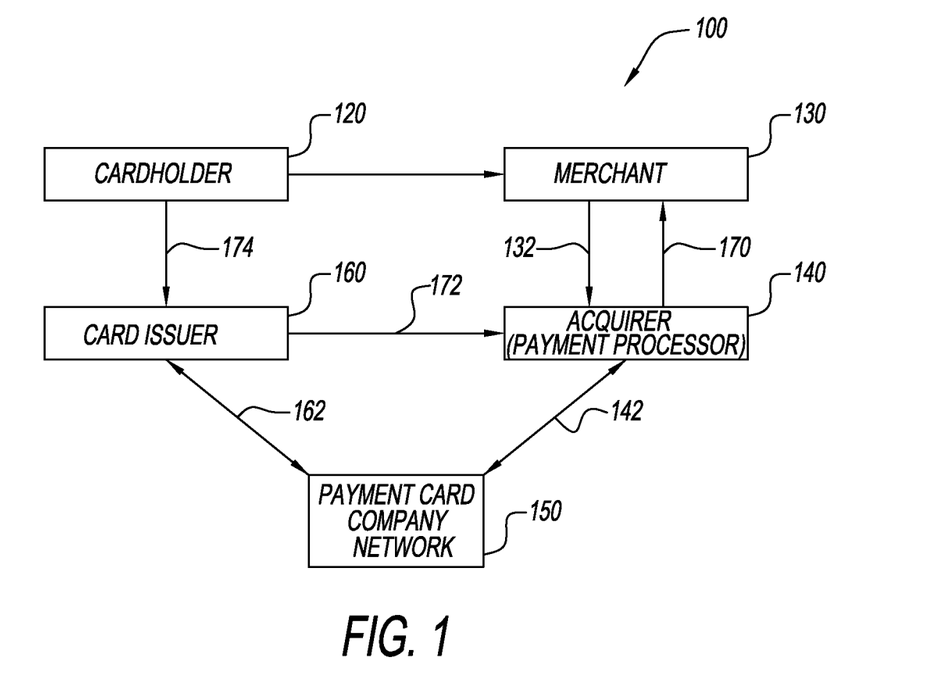
FIG. 1 is a block diagram illustrating a high-level view of system architecture of a financial transaction processing system in accordance with exemplary embodiments.

Referring to the drawings and, in particular, FIG. 1, there is shown a four party payment (credit, debit or other) card system generally represented by reference numeral 100. In card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes the financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

In accordance with the method of this disclosure, information that is stored in one or more databases can be retrieved (e.g., by a processor). The information can contain, for example, purchasing and payment activities attributable to payment card holders. Illustrative information can include, for example, financial (e.g., billing statements and payments), purchasing information, demographic (e.g., age and gender), geographic (e.g., zip code and state or country of residence), and the like.

In an embodiment, all of the information stored in the one or more databases can be retrieved. In another embodiment, only a single entry in the one or more databases can be retrieved. The retrieval of information can be performed a single time, or performed multiple times. In an exemplary embodiment, only information pertaining to a specific payment card holder profiles can be retrieved from the databases.

In accordance with the method of this disclosure, payment card holder profiles are generated based at least in part on the information from the financial transaction processing entity. Payment card holder profiles can be selected based on the information obtained and stored in the one or more databases. The selection of information for representation in the payment card holder profiles can be different in every instance. In one embodiment, all of the information stored in the databases can be used for selecting payment card holder profiles. In an alternative embodiment, only a portion of the information can be used. The generation and selection of payment card holder profiles can be based on specific criteria.

Payment card holder profiles are generated from the information obtained from the databases. The information is analyzed, extracted and correlated by, for example, a financial transaction processing company (e.g., a payment card company), and can include financial account information, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

Activities and characteristics attributable to the payment card holders based on the payment card holder profiles are identified. The payment card holders have a propensity to carry out certain activities and to exhibit certain characteristics based on the payment card holder profiles. The payment card holder profiles are conveyed by the financial transaction processing entity to the database configured to store payment card holder profiles. This enables access to the one or more databases configured to store the payment card holder profiles holders. Targeted interaction can then be effected between payment card holders based at least in part on the payment card holder profiles. The access can be performed by any suitable method as will be apparent to persons having skill in the relevant art.

Payment card holder profiles can be defined based on geographical or demographical information, such as age, gender, income, marital status, postal code, income, spending propensity, familial status, and the like. In some embodiments, payment card holder profiles can include a plurality of geographical and/or demographical categories. For example, a payment card holder profile can define a card holder with an income between $50,000 and $74,999, that is between the ages of 20 and 29, and is single. This information will enable targeted interaction between payment card holders having similarities, including but not limited to, similar interests, and likes.

Payment card holder profiles can also be based on behavioral variables. For example, the financial transaction processing entity database can store information relating to financial transactions. The information can be used to determine an individual's likeliness to spend. An individual's likeliness to spend can be represented generally, or with respect to a particular industry (e.g., electronics), retailer (e.g., Macy's®), brand (e.g., Apple®), or any other criteria that can be suitable as will be apparent to persons having skill in the relevant art. An individual's behavior can also be based on additional factors including, but not limited to, time, location, and season. For example, a payment card holder profile can be based on consumers who are likely to spend on electronics during the holiday season, or on consumers whose primary expenses are in a suburb, but are likely to spend on restaurants located in a major city. The factors and behaviors identified can vary widely and may be based on the application of the information.

Behavioral variables can also be applied to generated payment card holder profiles based on the attributes of the entities. For example, a payment card holder profile of specific geographical and demographical attributes (e.g., single males in a particular postal code between the ages of 26-30 with an income between $100,000 and $149,999) can be analyzed for spending behaviors. Results of the analysis can be assigned to the payment card holder profiles. For example, the above payment card holder profile is analyzed and reveal that the entities in the payment card holder profile have a high spending propensity for electronics and are less likely to spend money during the month of February.

In an embodiment, the information retrieved from the databases can be analyzed to determine behavioral information of the payment card holders. Also, information related to an intent of the payment card holders can be extracted from the behavioral information. The payment card holder profiles can be based upon the behavioral information of the payment card holders and the intent of the payment card holders. The payment card holder profiles can also be based upon information capable of predicting behavior and intent in the payment card holders.

Payment card holder profiles can, for example, include spend behaviors and spend associations. A spend association can be a set of spend behaviors that predict another spend behavior. For example, people that tend to purchase jewelry display the following spend behaviors: spend at Macy's®, travel on cruise ships, go to the movie theaters once a month, and the like.

Figure 2:
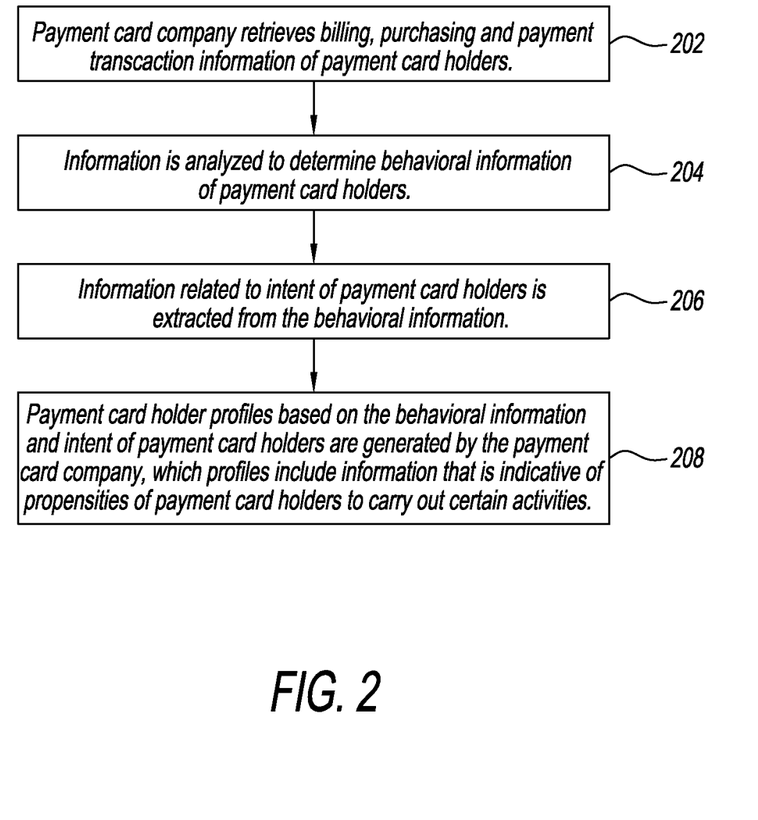
FIG. 2 is a flow chart illustrating a method for generating payment card holder profiles in accordance with exemplary embodiments of this disclosure.

A method for generating payment card holder profiles is an embodiment of this disclosure. Referring to FIG. 2, the method involves a payment card company (part of the payment card company network 150 in FIG. 1) retrieving, from one or more databases, information including activities and characteristics attributable to payment card holders. The information 202 comprises payment card billing, purchasing and payment transactions, and optionally demographic and/or geographic information. The information is analyzed 204 to determine behavioral information of the payment card holders. Information related to an intent 206 of the payment card holders is extracted from the behavioral information. Payment card holder profiles are generated 208 based on the behavioral information and intent of the payment card holders. The payment card holders have a propensity to carry out certain activities based on information contained in the payment card holder profiles.

In analyzing information to determine behavioral information, intent and other payment card member attributes are considered. Developing intent of payment card holders involves predicting specific spend behavior in the future and desirable spend behaviors. Examples include as follows: likely to purchase at Macy's® in the next 2 weeks; likely to spend at least $100 in consumer electronics in the next 30 days; likely to purchase a car in the next 60 days; likely to be interested in golfing; likely to be up for a cell phone renewal in the next 60 days; likely to be a business traveler; and the like.

Payment card holder profiles can include information that equates to purchase behaviors. There can be different degrees of purchase behavior with the ultimate behavior being a purchase. An example using Macy's® is as follows: an extreme behavior is a consumer purchasing something once a week at Macy's® and spending five times what the average customer spends; a medium behavior is a consumer purchasing something at Macy's® once a month and spending twice what the average customer spends; and a low behavior is a consumer purchasing something at Macy's® once a year and spending what the average customer spends.

There is the potential for numerous information in payment card holder profiles including, for example, industries (consumer electronics, QSR), categories (online spend, cross border), geography spend (spend in New York City, spend in London), geography residence (live in New York City, live in Seattle), day/time spend (weekday spend, lunch time spend), calendar spend (spend a lot around Christmas, spend a lot on flowers before Valentine's Day), top number of merchants, and the like.

Other card holder attributes part of the information include, for example, geography (such as, zip code, state or country), and demographics (such as, age, gender, and the like.).

Figure 3:
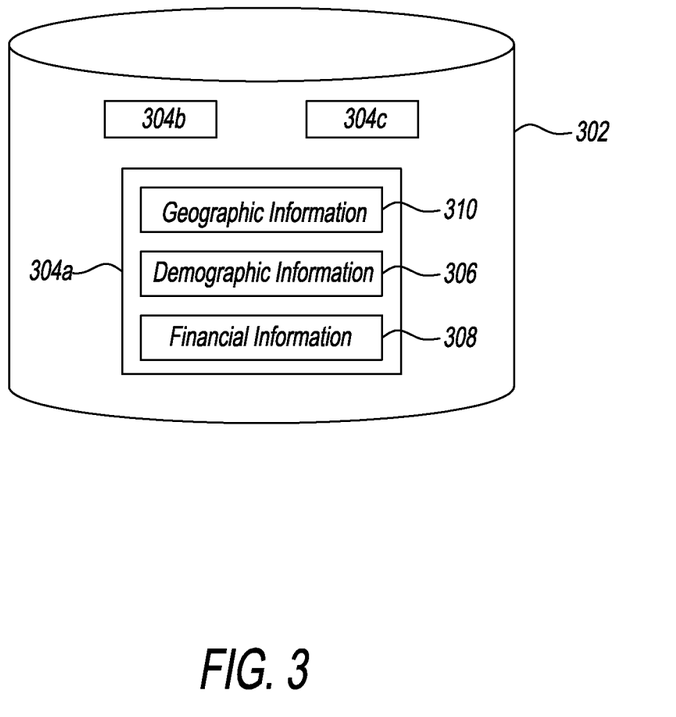
FIG. 3 is a block diagram illustrating illustrates a dataset for the storing, reviewing, and/or analyzing of information used in generating payment card holder profiles in accordance with exemplary embodiments.

FIG. 3 illustrates an exemplary dataset 302 for the storing, reviewing, and/or analyzing of information used in generating payment card holder profiles. The dataset 302 can contain a plurality of entries (e.g., entries 304a, 304b, and 304c).

The demographic information 306 can include any demographic or other suitable information relevant to the particular application. For example, if a family restaurant is launching an advertising campaign and is requesting data of families with a spend propensity on restaurants, then the demographic information can include familial status, but not age. If a bar is launching an advertising campaign, then demographic information can include age, but not familial status. In some embodiments, the geographic information 310 can include geographic or other suitable information relevant to the particular application. Suitable types of information relevant for generating payment card holder profiles will be apparent to persons having skill in the relevant art. Likewise, the financial information 308 can include any financial information relevant to the particular application. For example, a dataset directed to advertisers in the food service industry can contain entries with financial information that includes a spend propensity for restaurants, but not a spend propensity for electronics.

Payment card holders can represent a wide variety of categories and attributes. In one embodiment, payment card holders can be created based on spending propensity of spending index in a particular industry. Industries can include, as will be apparent to persons having skill in the relevant art, restaurants (e.g., fine dining, family restaurants, fast food), apparel (e.g., women's apparel, men's apparel, family apparel), entertainment (e.g., movies, professional sports, concerts, amusement parks), accommodations (e.g., luxury hotels, motels, casinos), retail (e.g., department stores, discount stores, hardware stores, sporting goods stores), automotive (e.g., new car sales, used car sales, automotive stores, repair shops), travel (e.g., domestic, international, cruises), and the like. Each industry can include a plurality of payment card holders (e.g., based on location, income groups, and other such factors.).

Payment card holders can be based on predictions of future behavior. For instance, a financial transaction processing company can analyze financial account information and behavioral information to predict future behavior of payment card holders.

Payment card holders can be aligned with other similar payment card holders. Similar payment card holders can be determined by similarities in, for example, the payment card holder parameters (e.g., nearby postal codes), or in the entities contained in the payment card holder profiles (e.g., a larger number of card holders common to both payment card holder groups). In one embodiment, the financial transaction processing company creates payment card holders based on received parameters, which is aligned to payment card holders created by a third party on the same parameters yet include different entities or behaviors. The process and parameters for the alignment of payment card holders can depend on the application of the payment card holders, as will be apparent to persons having skill in the relevant art.

A financial transaction processing company can analyze the generated payment card holder profiles (e.g., by analyzing the stored data for each entity comprising the payment card holder profile) for behavioral information (e.g., spend behaviors and propensities). In some embodiments, the behavioral information can be represented by a behavioral propensity score. Behavioral information can be assigned to each corresponding payment card holder profile, or assigned to a group of payment card holder profiles.

Usage segments, purchase clusters and micro-segment methodologies can be leveraged to help define payment card holders and deliver more accurate matches.

Payment card holder profiles or behavioral information can be updated or refreshed at a specified time (e.g., on a regular basis or upon request of a party). Updating payment card holder profiles can include updating the entities included in each payment card holder profile with updated demographic data and/or updated financial data. Payment card holder profiles can be updated by changing the attributes that define each payment card holder profile, and generating a different set of behaviors. The process for updating behavioral information can depend on the circumstances regarding the need for the information itself.

The payment card holder profiles are provided to payment card holders to effect targeted interaction between the payment card holders based at least in part on the payment card holder profiles. The targeted interactions include, for example, connection with potential suitors, sports fans, concertgoers, fellow shopaholics with the same purchase patterns, and the like.

The content of each payment card holder profile is controlled by the payment card holder identified with the payment card holder profile. The payment card holders will be able to control their profile and exclude certain purchases from the algorithm used to create the transaction verified profile. The payment card holders will also be able to specify what they intend to get out of the service (e.g., connect with potential suitors, sports fans, concertgoers, fellow shopaholics with the same purchase patterns).

The payment card holder profiles contain no payment card holder personal transaction or spend information. Payment card holders will have complete control over the visibility of their profiles.

The payment card holder profiles are provided to payment card holders through an access path comprising, for example, a portal, a network or a web site. The access path includes, for example, an Internet connected device for connecting to the portal, network or web site. The internet connected device can include, for example, a mobile telephone, a computer, a tablet, and a personal digital assistant. At the portal, network or web site, customers (i.e., payment card holders) can sign up and give their payment card numbers that will populate a profile that uses real purchase history. A unique payment card holder profile will be built off (algorithm) of their observed spending habits and any demographic information provided by the payment card holder (e.g., aged, gender, locations of interest, and such like information.).

The social connection portal, network or website is based on access to payment card holder purchase and spend history. The social connection portal, network or website is a social connection tool where users do not have to blindly trust the validity of the profiles on their screen. Because the payment card holder is what he or she buys.

Access to the one or more databases configured to store the payment card holder profiles is granted through a communication device. The communication device is, for example, configured as a mobile platform.

One or more profiling algorithms can be employed to determine formulaic descriptions of the assembly of the payment card holder information including payment card billing, purchasing and payment transactions and optionally demographic and/or geographic information, using any of a variety of known mathematical techniques. These formulas in turn can be used to derive or generate payment card holder profiles using any of a variety of available trend analysis algorithms. The algorithms can be used to create transaction verified payment card holder profiles.

Figure 4:
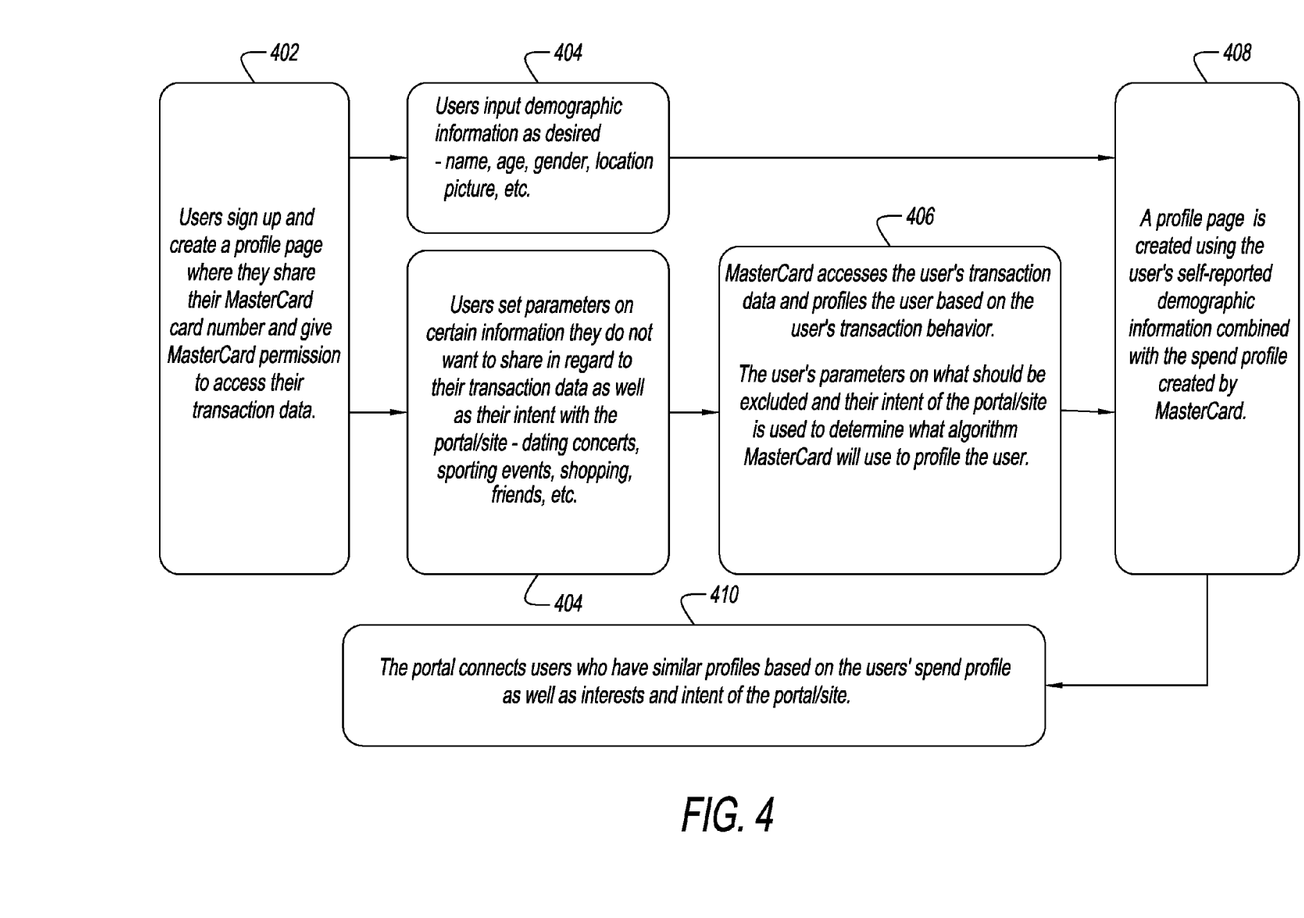
FIG. 4 is a block diagram illustrating a method for socially connecting payment card holders in accordance with an embodiment of this disclosure.

Referring to FIG. 4, in accordance with the method of this disclosure, payment card holders sign up and create a profile page at 402 where they share their payment card number and give the payment card company (part of the payment card company network 150 in FIG. 1) permission to access their transaction data. At 404, the payment card holders can input demographic information as desired (e.g., name, age, gender, location, picture, and other demographic information.). Also at 404, the payment card holders set parameters on certain information that they do not want to share in regards to their transaction data as well as their intent with the tool (e.g., dating, concerts, sporting events, shopping friends, and the like.).

At 406, the payment card company will access the payment card holder's transaction data and profile the payment card holder based on the transaction data. The payment card holder's parameters on what should be excluded and their intent of the portal/site will be used to determine what algorithm the payment card company will use to profile the payment card customer.

At 408, a payment card holder profile page will be created by the payment card company using the self-reported demographic information from the payment card holder combined with the spend profile created by the payment card company. The portal at 410 will connect payment card holders who have similar profiles based on the payment card holder's spend profile as well as interests and intent of the portal/site.

Figure 5:
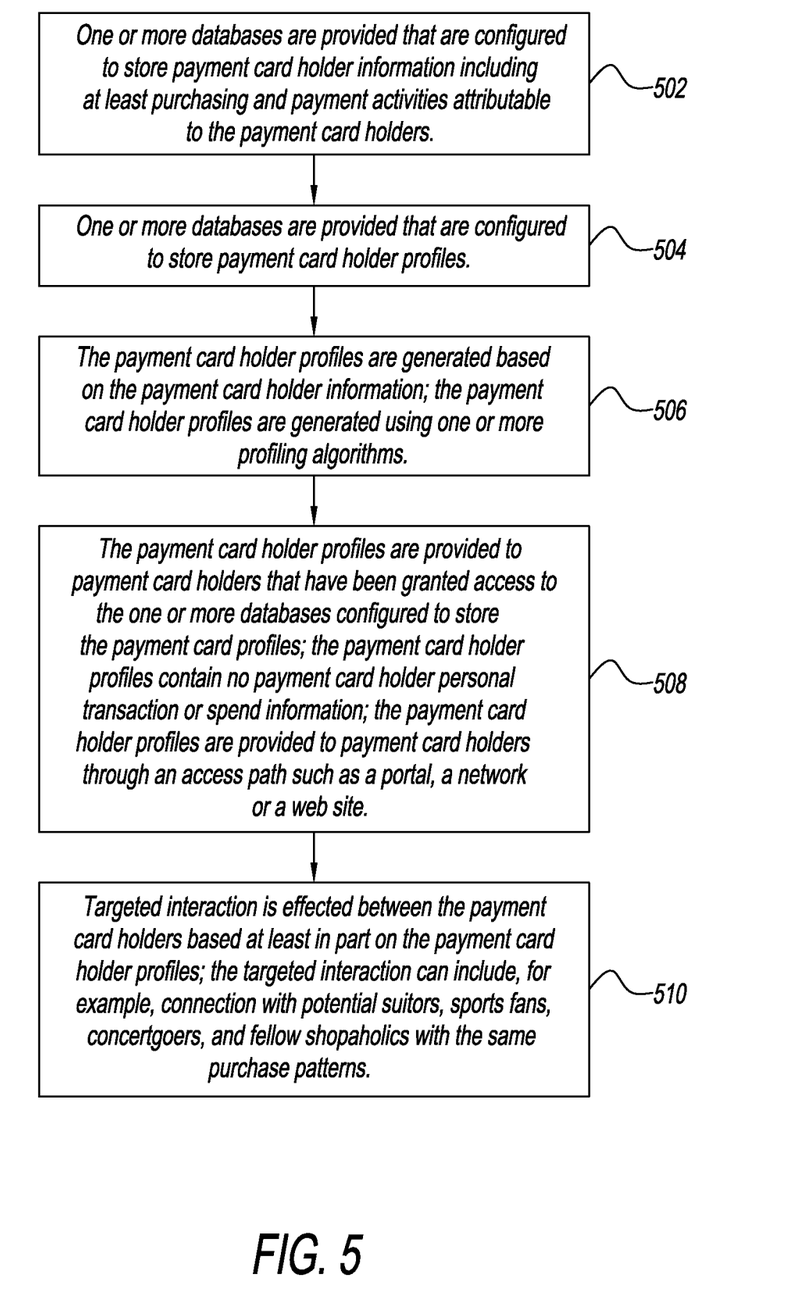
FIG. 5 is a flow chart illustrating a method for socially connecting payment card holders in accordance with an embodiment of this disclosure.

FIG. 5 illustrates the method for socially connecting payment card holders in accordance with this disclosure. At 502, one or more databases are provided that are configured to store payment card holder information including at least purchasing and payment activities attributable to said payment card holders. At 504, one or more databases are provided that are configured to store payment card holder profiles. At 506, the payment card holder profiles are generated by a payment card company (part of the payment card company network 150 in FIG. 1) based on the payment card holder information. The payment card holder profiles are generated using one or more profiling algorithms. At 508, the payment card holder profiles are provided to payment card holders that have been granted access to the one or more databases configured to store the payment card holder profiles. The payment card holder profiles contain no payment card holder personal transaction or spend information. The payment card holder profiles are provided to payment card holders through an access path, such as a portal, a network or a web site. At 510, targeted interaction is effected between the payment card holders based at least in part on the payment card holder profiles. The targeted interaction can include, for example, connection with potential suitors, sports fans, concertgoers, and fellow shopaholics with the same purchase patterns.

It will be understood that the present disclosure can be embodied in a computer readable non-transitory storage medium storing instructions of a computer program that when executed by a computer system results in performance of steps of the system or method described herein. Such storage media can include any of those mentioned in the description above.

In particular, there is provided a computer readable non-transitory storage medium storing instructions of a computer program, which when executed by a computer system, results in performance of steps of: storing in an electronic storage device one or more databases configured to store payment card holder information including at least purchasing and payment activities attributable to said payment card holders, and one or more databases configured to store payment card holder profiles; accessing the database; generating the payment card holder profiles based on the payment card holder information; and providing the payment card holder profiles to payment card holders that have been granted access to the one or more databases configured to store the payment card holder profiles.

Where methods described above indicate certain events occurring in certain orders, the ordering of certain events may be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when stated herein that something is "based on" something else, it may be based on one or more other things as well. In other words, unless expressly indicated otherwise, as used herein "based on" means "based at least in part on" or "based at least partially on."

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system for connecting payment card holders on a social network, the system comprising:
    an electronic storage device having
        a payment card holder profile database configured to store a plurality of payment card holder profiles for a plurality of payment card holders; and
        a financial transaction processing entity database configured to store at least payment card transaction information for the plurality of payment card holders, demographic information for the plurality of payment card holders, and geographic information for the plurality of payment card holders;
    a program memory configured to store a payment card holder profile generating algorithm;
    a social network web portal configured to access the payment card holder profile database; and
    a processor configured to:
        receive, via the social network web portal, from a payment card holder of the plurality of payment card holders, a payment card number, a permission to access payment card transaction information of the payment card holder, a user intent parameter regarding a purpose for using the social network web portal, and an exclusion parameter for excluding selected information from being used by the payment card holder profile generating algorithm;
        access the financial transaction processing entity database and obtain payment card holder information for the payment card holder including payment card transaction information for the payment card holder, demographic information for the payment card holder, and geographic information for the payment card holder;
        analyze the payment card holder information to determine behavioral information of the payment card holder, the behavioral information including a spend association that predicts a future spend behavior of the payment card holder;
        generate, by executing the payment card holder profile generating algorithm, a payment card holder profile for the payment card holder from (1) the obtained payment card holder information, (2) the determined spend association, and (3) the received user intent and exclusion parameters;
        generate a transaction verified payment card holder webpage on the social network web portal for the payment card holder; and
        connect the payment card holder profile to other payment card holder profiles of other payment card holders generated by the payment card holder profile generating algorithm and stored in the payment card holder profile database based on behavioral information and user intent parameters of each of the other payment card profiles,
    wherein the generated transaction verified payment card holder profile webpage does not contain the payment card transaction information of the payment card holder.

2. The system of claim 1, wherein the payment card transaction information for the payment card holder comprises payment card billing, purchasing and payment transaction.

3. The system of claim 1, wherein the social network web portal is configured to facilitate targeted interaction between the payment card holders based on the payment card holder profiles.

4. The system of claim 1, wherein the processor is further configured to:
    extract information related to the user intent parameter of the payment card holder from the behavioral information.

5. The system of claim 1, wherein the social network web portal is accessible by an Internet connected device.

6. The system of claim 1, wherein the demographic information for the plurality of payment card holders comprises age, gender, location, and picture.

7. The system of claim 1, wherein the payment card holder profile database is accessible by a communication device configured as a mobile platform.

8. A computer-executable method for connecting payment card holders on a social network system comprising
    a processor;
    an electronic storage device having
        a payment card holder profile database configured to store a plurality of payment card holder profiles for a plurality of payment card holders;
        a financial transaction processing entity database configured to store at least payment card transaction information for the plurality of payment card holders, demographic information for the payment card holders, and geographic information for the payment card holders; and
a program memory configured to store a payment card holder profile generating algorithm; and
a social network web portal configured to access the payment card holder profile database;
the method comprising, when the processor executes instructions in the program memory:
receiving, via the social network web portal, from a payment card holder of the plurality of payment card holders, a payment card number, a permission to access the payment card holder transaction information of the payment card holder, a user intent parameter regarding a purpose for using the social network web portal, and an exclusion parameter for excluding selected information from being used by the payment card holder profile generating algorithm;
accessing the financial transaction processing entity database and obtaining payment card holder information for the payment card holder including payment card transaction information for the payment card holder, demographic information for the payment card holder, and geographic information for the payment card holder;
analyzing the payment card holder information to determine behavioral information of the payment card holder, the behavioral information including a spend association that predicts a future spend behavior of the payment card holder;
generating, by executing the payment card holder profile generating algorithm, a payment card holder profile for the payment card holder, from (1) the obtained payment card holder information, (2) the determined spend association, and (3) the received user intent and exclusion parameters;
generating a transaction verified payment card holder webpage on the social network web portal for the payment card holder; and
connecting the payment card holder profile to other payment card holder profiles of other payment card holders generated by the payment card holder profile generating algorithm and stored in the payment card holder profile database based on determined behavioral information and user intent parameters of each of the other payment card profiles,
wherein the generated transaction verified payment card holder profile webpage does not contain the payment card transaction information of the payment card holder.

9. The method of claim 8, wherein the method further comprises: facilitating targeted interaction between the payment card holders for the connected payment card holder profiles based on behavioral information including the same purchase patterns.

10. The method of claim 8, wherein the method further comprises:
extracting information related to the user intent parameter of the payment card holder from the behavioral information.

11. The method of claim 8, wherein the payment card holder profile database is accessible to payment card holders through the social network web portal by an internet connected device.

12. The method of claim 8, wherein the demographic information for the plurality of payment card holders comprises age, gender, location, and picture.

13. A computer readable non-transitory storage medium storing instructions of a computer program, which when executed by a computer system comprising
a processor;
an electronic storage device having
a payment card holder profile database configured to store a plurality of payment card holder profiles for a plurality of payment card holders;
a financial transaction processing entity database configured to store at least payment card transaction information for the plurality of payment card holders, demographic information for the payment card holders, and geographic information for the payment card holders; and
a social network web portal configured to access the payment card holder profile database;
results in performance of steps including:
receiving, via the social network web portal, from a payment card holder of holder of the plurality of payment card holders, a payment card number, a permission to access the payment card holder information of the payment card holder, a user intent parameter regarding a purpose for using the social network web portal, and an exclusion parameter for excluding selected information shared from being used by a payment card holder profile generating algorithm stored in the computer program;
accessing the financial transaction processing entity database and obtaining payment card holder information for the payment card holder including payment card transaction information for the payment card holder, demographic information for the payment card holder, and geographic information for the payment card holder;
analyzing the payment card holder information to determine behavioral information of the payment card holder, the behavioral information including a spend association that predicts a future spend behavior of the payment card holder;
generating, by executing the payment card holder profile generating algorithm, a payment card holder profile for the payment card holder, from (1) the obtained payment card holder information, (2) the determined spend association, and (3) the received user intent and exclusion parameters;
generating a transaction verified payment card holder webpage on the social network web portal for the payment card holder; and
connecting the payment card holder profile to other payment card holder profiles of other payment card holders generated by the payment card holder profile generating algorithm and stored in the payment card holder profile database based on determined behavioral information and user intent parameters of each of the other payment card profiles,
wherein the generated transaction verified payment card holder profile webpage does not contain the payment card transaction information of the payment card holder.

* * * * *